United States Patent
Hicks et al.

(10) Patent No.: US 11,991,050 B2
(45) Date of Patent: May 21, 2024

(54) DRIFT DETECTION IN EDGE DEVICES VIA MULTI-ALGORITHMIC DELTAS

(71) Applicant: International Business Machines Corporation, Armonk, NY (US)

(72) Inventors: Andrew C. M. Hicks, Highland, NY (US); Michael Terrence Cohoon, Fishkill, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/049,362

(22) Filed: Oct. 25, 2022

(65) Prior Publication Data

US 2024/0137286 A1    Apr. 25, 2024

(51) Int. Cl.
*H04L 41/16* (2022.01)
*H04L 41/0631* (2022.01)

(52) U.S. Cl.
CPC .......... *H04L 41/16* (2013.01); *H04L 41/0631* (2013.01)

(58) Field of Classification Search
CPC ............................ H04L 41/0631; H04L 41/16
USPC ........................................................ 709/224
See application file for complete search history.

(56) References Cited

U.S. PATENT DOCUMENTS

2015/0286638 A1* 10/2015 Li ......................... G06F 16/128
                                                                  382/190
2017/0330109 A1* 11/2017 Maughan ................. G06N 5/04
2018/0060738 A1*  3/2018 Achin .................... G06N 20/00
2020/0342260 A1* 10/2020 Farchi ................... G06F 18/214
2021/0157872 A1*  5/2021 David ................... G06F 40/279
2021/0174246 A1*  6/2021 Triplet ..................... G06N 7/01
2021/0334695 A1  10/2021 Raj et al.
2021/0365478 A1  11/2021 Mopur et al.
(Continued)

FOREIGN PATENT DOCUMENTS

CN        112508177 A    *  3/2021
CN        114611696 A    *  6/2022

OTHER PUBLICATIONS

English translation of CN-114611696-A, Clarivate Analytics, pp. 1-18 (2022) (Year: 2022).*
(Continued)

*Primary Examiner* — David P Zarka
(74) *Attorney, Agent, or Firm* — Amin, Turocy & Watson, LLP

(57) ABSTRACT

One or more systems, devices, computer program products and/or computer-implemented methods provided herein relate to data drift detection in an edge device. A system can comprise a memory configured to store computer executable components; and a processor configured to execute the computer executable components stored in the memory, wherein the computer executable components can comprise a verification component that can verify accuracy of a first model and accuracy of a second model to detect data drift associated with an edge device that is deployed without network connectivity; a computation component that can compute at least a first ratio based on the accuracy of the first model and the accuracy of the second model; and an analysis component that can use the at least the first ratio to determine whether performance degradation of at least one of the first model or the second model is a function of the data drift.

20 Claims, 7 Drawing Sheets

(56) References Cited

U.S. PATENT DOCUMENTS

| | | |
|---|---|---|
| 2021/0390455 A1 | 12/2021 | Schierz et al. |
| 2022/0004916 A1* | 1/2022 | Shibui ................ G06Q 30/0631 |
| 2022/0101186 A1 | 3/2022 | Sharma Mittal et al. |
| 2022/0179938 A1* | 6/2022 | Zotto ...................... G06F 21/36 |
| 2022/0215289 A1 | 7/2022 | Mopur et al. |
| 2023/0092949 A1* | 3/2023 | Gopinath ............... G06N 3/084 |
| | | 706/12 |
| 2023/0093130 A1* | 3/2023 | Fenoglio ............ G06F 18/2433 |
| | | 709/224 |
| 2023/0308359 A1* | 9/2023 | Vasseur ............... H04L 41/0654 |
| | | 370/216 |

OTHER PUBLICATIONS

English translation of CN-112508177-A, Clarivate Analytics, pp. 1-15 (2021) (Year: 2021).*

Ackerman, S. et al. | "Detection of Data Drift and Outliers Affecting Machine Learning Model Performance Over Time." arXiv:2012.09258v2 [stat.AP] Jan. 20, 2021, 17 pages.

Ackerman, S. et al. | "Automatically detecting data drift in machine learning classifiers." arXiv:2111.05672v1 [cs.LG] Nov. 10, 2021, 9 pages.

Mallick, A. et l. | "Matchmaker: Data Drift Mitigation in Machine Learning for Large-Scale Systems". Proceedings of the 5 th MLSys Conference, Santa Clara, CA, USA, 2022, 18 pages.

* cited by examiner

DRIFT DETECTION IN EDGE DEVICES VIA MULTI-ALGORITHMIC DELTAS

BACKGROUND

The subject disclosure relates to machine learning and, more specifically, to drift detection in edge devices via multi-algorithmic deltas.

SUMMARY

The following presents a summary to provide a basic understanding of one or more embodiments described herein. This summary is not intended to identify key or critical elements, delineate scope of particular embodiments or scope of claims. Its sole purpose is to present concepts in a simplified form as a prelude to the more detailed description that is presented later. In one or more embodiments described herein, systems, computer-implemented methods, apparatus and/or computer program products that enable drift detection in edge devices via multi-algorithmic deltas are discussed.

According to an embodiment, a computer-implemented system is provided. The computer-implemented system can comprise a memory configured to store computer executable components; and a processor configured to execute the computer executable components stored in the memory, wherein the computer executable components can comprise a verification component that can verify accuracy of a first model and accuracy of a second model to detect data drift associated with an edge device that is deployed without network connectivity; a computation component that can compute at least a first ratio based on the accuracy of the first model and the accuracy of the second model; and an analysis component that can use the at least the first ratio to determine whether performance degradation of at least one of the first model or the second model is a function of the data drift.

According to another embodiment, a computer-implemented method is provided. The computer-implemented method can comprise verifying, by a system operatively coupled to a processor, accuracy of a first model and accuracy of a second model to detect data drift associated with an edge device that is deployed without network connectivity; computing, by the system, at least a first ratio based on the accuracy of the first model and the accuracy of the second model; and determining, by the system, whether performance degradation of at least one of the first model or the second model is a function of the data drift by using the at least the first ratio.

According to yet another embodiment, a computer program product for detecting data drift in an edge device deployed without network connectivity is provided. The computer program product can comprise a computer readable storage medium having program instructions embodied therewith, the program instructions executable by a processor to cause the processor to verify, by the processor, accuracy of a first model and accuracy of a second model to detect the data drift associated with the edge device, wherein the edge device is deployed without network connectivity; compute, by the processor, at least a first ratio based on the accuracy of the first model and the accuracy of the second model; and determine, by the processor, whether performance degradation of at least one of the first model or the second model is a function of the data drift, by using the at least the first ratio.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

Drift detection is advantageous for artificial intelligence (AI) models and/or machine learning (ML) models because data drift for AI or ML models can have unfavorable consequences. Data drift can be defined as changes in input data of an AI or ML model that can impact performance of the AI or ML model. Data drift can result when production data distribution is different from training data distribution. Thus, detection of data drift in AI or ML models can be beneficial. However, with drift detection, a feedback loop is required to observe that a model's (e.g., AI model or ML model) performance is drifting off from what is considered algorithmically correct for the respective model, and the feedback can be achieved by comparing two data sets, for example, by comparing training data of the model with production data ingested by the model during deployment.

Drift detection can be challenging in edge devices that are deployed without network connectivity because without a network connection, data required for feedback to detect data drift associated with an AI or ML model deployed in the edge device can be difficult to obtain. For example, if an ML model, associated with an edge device that is deployed without network connectivity, is experiencing data drift, the ML model can gradually begin to classify things incorrectly. For example, an algorithm for image detection can begin detecting images of deer as images of kangaroos as a result of data drift, and if no feedback is available, for example, to a data scientist in charge of the algorithm or to an automated system, the data drift can go undetected. For example, sensors and internet of things (IoT) devices deployed without network connectivity can experience data drift that can be undetected. Accordingly, systems and methods that can enable drift detection in edge devices via multi-algorithmic deltas are discussed in one or more embodiments herein.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1:
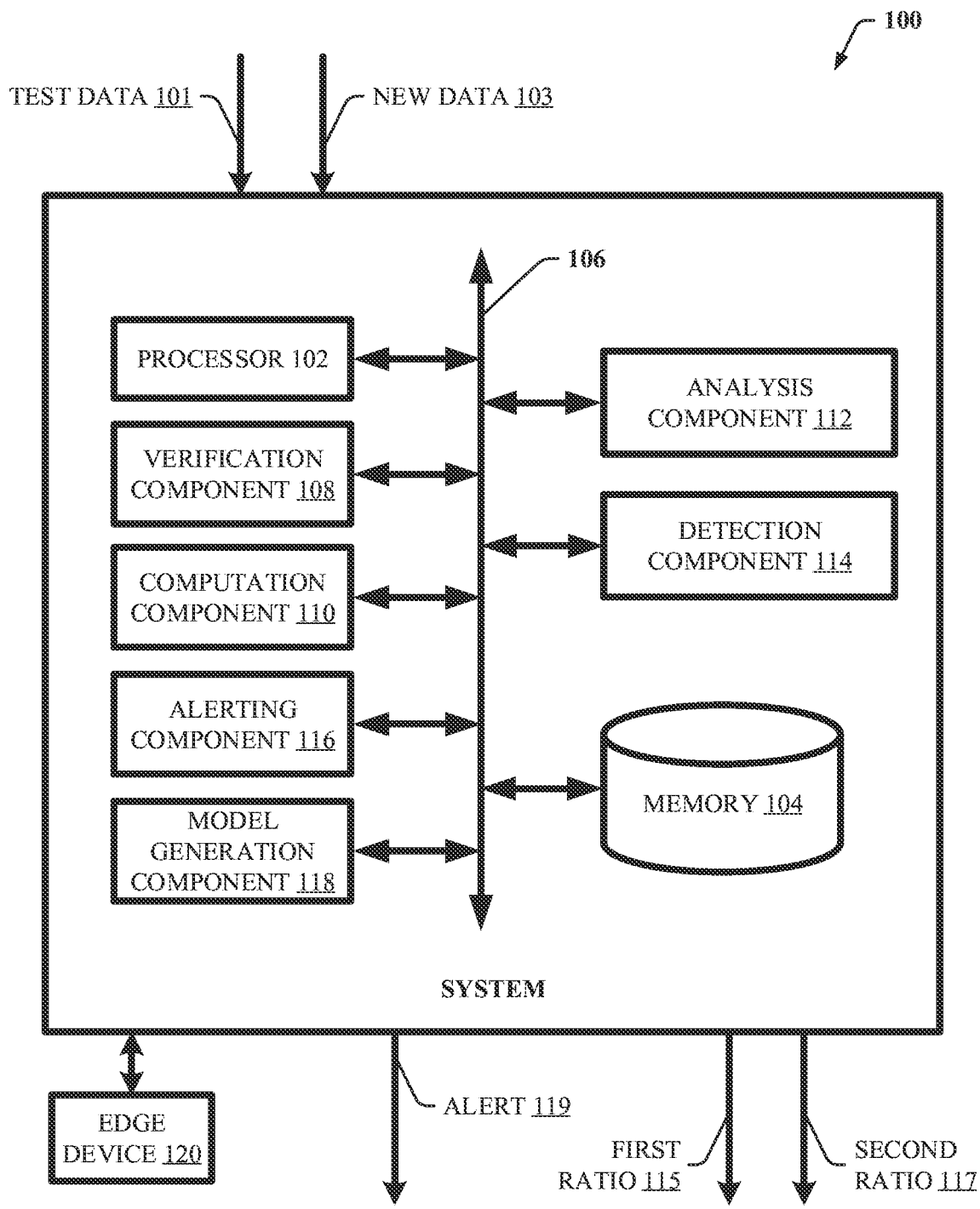
FIG. 1 illustrates a block diagram of an example, non-limiting system that can detect data drift in an edge device deployed without network connectivity in accordance with one or more embodiments described herein.

FIG. 1 illustrates a block diagram of an example, non-limiting system 100 that can detect data drift in an edge device deployed without network connectivity in accordance with one or more embodiments described herein. System 100 can comprise processor 102, memory 104, system bus 106, verification component 108, computation component 110, analysis component 112, detection component 114, alerting component 116 and model generation component 118.

In one or more embodiments, model generation component 118 can generate a first model (e.g., an AI model or an ML model) based on machine learning algorithms, and model generation component 118 can generate a second model (e.g., an AI model or an ML model) based on machine learning algorithms. For example, the first model and the second model can be machine learning models used by an image detection device to detect images of birds. The first model can be generated as having a high accuracy (e.g., a 98 percent (%) accuracy in detecting images of birds), and the second model can be generated as having a lower accuracy than the first model (e.g., an 80% accuracy in detecting images of birds). Verification component 108 can verify accuracy of the first model and accuracy of the second model to detect data drift associated with edge device 120 deployed without network connectivity.

For example, verification component 108 can verify the accuracy of the first model and the accuracy of the second model based on test data 101, wherein test data 101 can comprise a mixture of data with varying percentages of drift. Drift (e.g., data drift) can occur when the model inputs deviate from expectations. It is typically something that can occur over time. For example, test data 101 can comprise varying percentages of images of flowers in addition to images of birds. The accuracy of the first model and the accuracy of the second model can be respectively verified (e.g., by verification component 108) based on how many images of birds can be respectively detected by the first model and the second model from test data 101. For example, in a first test, test data 101 can comprise 100 birds and 100 flowers, and the first model can detect 98 birds and 102 flowers, thereby verifying that the first model can perform with 98% accuracy. For example, the second model can detect 80 birds and some unknowns, thereby verifying that the second model can perform with 80% accuracy. Computation component 110 can compute at least a first ratio based on the accuracy of the first model and the accuracy of the second model. For example, computation component 110 can compute first ratio 115 wherein, first ratio 115 can be equal to 1.225 according to equation 1.

$$\text{First ratio}\,(e.g.,\,\text{first ratio}\,115) = \frac{\text{accuracy of the first model}}{\text{accuracy of the second model}} \quad \text{Equation 1}$$
$$= \frac{98\%}{80\%}$$
$$= 1.225$$

Verification component 108 can further verify the accuracy of the first model and the accuracy of the second model based on new data 103 received by edge device 120. For example, system 100 can be associated with edge device 120 that can be deployed without network connectivity, and edge device 120 can ingest new data 103 (e.g., production level data or real-time data) comprising images of birds and flowers. Verification component 108 can verify accuracy of the first model and accuracy of the second model based on the number of images of birds respectively detected by the first model and the second model out of a total number of images ingested by edge device 120. Computation component 110 can generate second ratio 117 based on the accuracy of the first model and the accuracy of the second model verified by verification component 108 based on data received by edge device 120. For example, the first model can exhibit an accuracy of 85% in detecting images of birds upon deployment, and the second model can exhibit an accuracy of 75% in detecting images of birds upon deployment resulting in a second ratio (e.g., second ratio 117) of about 1.133.

Analysis component 112 can use first ratio 115 and second ratio 117 to determine whether performance degradation of at least one of the first model or the second model is a function of the data drift. For example, analysis component 112 can analyze first ratio 115 and second ratio 117 to determine the difference between first ratio 115 and second ratio 117. For example, in the exemplary scenario discussed herein, analysis component 112 can determine a difference of about 0.092 between the first ratio of 1.225 (e.g., first ratio 115) and the second ratio of about 1.133 (e.g., second ratio 117). Based on the difference exceeding a defined threshold, alerting component 116 can generate an alert to edge device 120, wherein the alert can be indicative of a data drift such that edge device 120 can flag incoming data after the alert. As example context of the ratio (division) embodiment: as time passes, if it is noticed that a main "production" model is not performing well, it's results can be compared to the second model. If it is seen that the ratio of performance stays approximately the same, it can be concluded that the models are performing similar to each other based on the incoming data. In this case, it can be concluded that there is no data drift. If this ratio greatly grows/shrinks, then it can be concluded there is data drift. Detection component 114 can detect performance degradation of at least one of the first model or the second model by detecting changes in respective distributions of confidence scores of the first model and the second model over time. It is to be appreciated that any suitable technique for determining data drift in an edge device can be utilized, e.g., calculating a delta (e.g., difference), creating a ratio of model performance (e.g., division), etc.

Thus, two models (e.g., the first model and the second model) can be generated wherein a first model (e.g., AI model or ML model) can exhibit the highest accuracy (e.g., about 100%) for performing a task (e.g., image detection, facial recognition, or other types of prediction) and wherein a second model (e.g., AI model or ML model) can exhibit a lower accuracy in comparison to the first model for performing the same task. Analysis of ratios of the respective accuracies of the first model and the second model, resulting from outputs generated by the two models based on test data (e.g., test data 101) and production data (e.g., new data 103), can enable detection of data drift in an edge device (e.g., edge device 120) associated with the two models.

Figure 2:
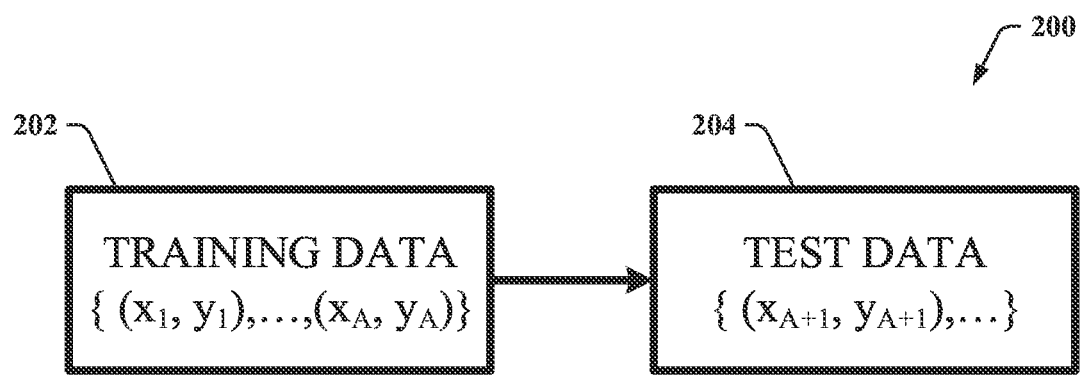
FIG. 2 illustrates a flow diagram in accordance with one or more embodiments described herein.

FIG. 2 illustrates a flow diagram 200 in accordance with one or more embodiments described herein. Repetitive description of like elements and/or processes employed in respective embodiments is omitted for sake of brevity.

In one or more embodiments, ML models (e.g., the first model and the second model) can be trained, at 202, on input data ($x_A$, $y_A$) wherein $x_A$ can be of arbitrary domain, and $y_A$ can be the target variable. The ML models (e.g., the first model and the second model) can be deployed for testing, at 204, wherein the test data ($x_{A+1}$, $y_{A+1}$) can have a similar data distribution as the training data while comprising additional data of the same type as the training data. For example, in the exemplary scenario discussed in FIG. 1 wherein the ML models (e.g., the first model and the second model) are trained to detect images of birds, the test data can comprise images of birds not included in the training data. Further discussion follows in FIG. 3.

Figure 3:
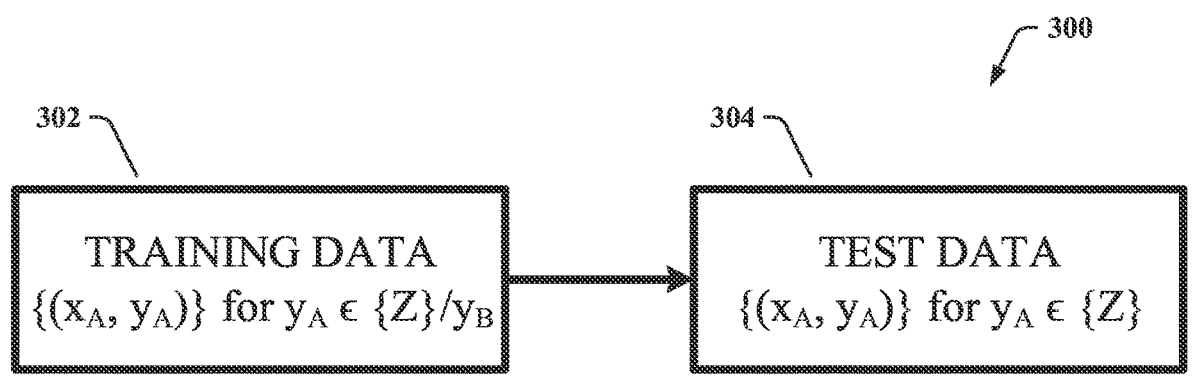
FIG. 3 illustrates another flow diagram in accordance with one or more embodiments described herein.

FIG. 3 illustrates another flow diagram 300 in accordance with one or more embodiments described herein. Repetitive description of like elements and/or processes employed in respective embodiments is omitted for sake of brevity.

In one or more embodiments, for example, in the context of the exemplary scenario discussed in FIGS. 1 and 2, $y_A$ of the training data set can belong to a set $\{Z\}/y_B$ wherein $\{Z\}$ can be a set of birds and flowers and $y_B$ can be a species of birds not included in the set $\{Z\}$ for training the ML models (e.g., the first model and the second model). At 302, the ML models (e.g., the first model and the second model) can be trained on the training data set where $y_B$ belongs to the set $\{Z\}/y_B$ such that the ML models can only detect images of birds belonging to the set $\{Z\}/y_B$. After training, the ML models can be tested using a test data set wherein $y_A$ can belong to the set $\{Z\}$, wherein set $\{Z\}$ can include the omitted bird species represented by $y_B$. Herein, $y_B$ can be introduced as drift data, and the outputs generated by the ML models (e.g., the first model and the second model) upon ingesting the test data at 304, can be used to verify accuracy of performance of the ML models when dealing with data drift. As discussed in one or more embodiments herein, the drift data belonging to the set $\{Z\}$ can be introduced in varying percentages during testing, to further verify accuracy of the ML models (e.g., the first model and the second model) in detecting the images of birds.

Figure 4:
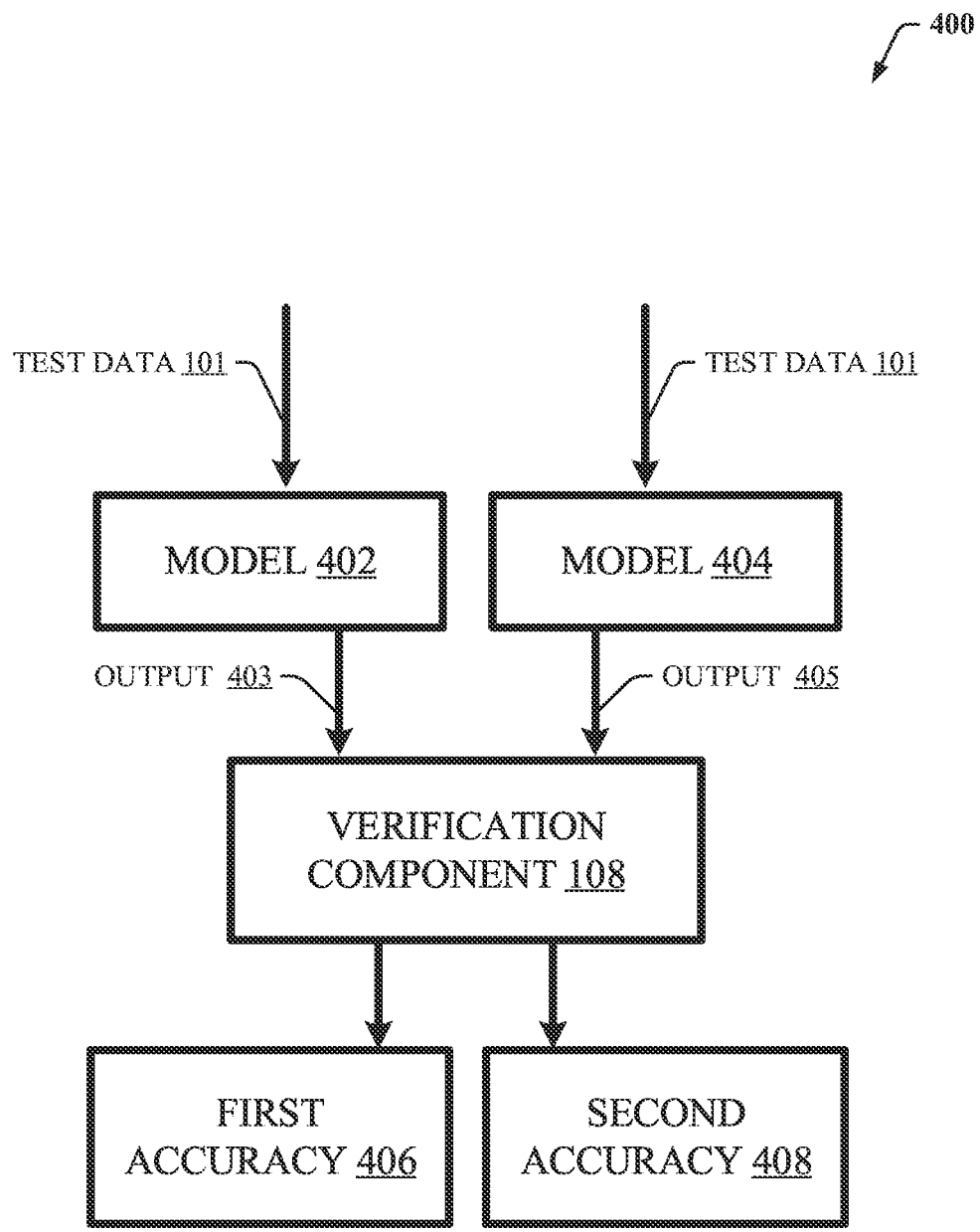
FIG. 4 illustrates a flow diagram of an example, non-limiting method that can enable testing respective accuracies of AI models using test data in accordance with one or more embodiments described herein.

FIG. 4 illustrates a flow diagram 400 of an example, non-limiting method that can enable testing respective accuracies of AI models using test data in accordance with one or more embodiments described herein. Repetitive description of like elements and/or processes employed in respective embodiments is omitted for sake of brevity.

In one or more embodiments, a standalone device (e.g., edge device 120 of FIG. 1) can lose network connectivity or connection to the internet and, therefore, also lose the ability to transmit feedback about the type of data being ingested by the standalone device in real-time. In absence of such feedback, data drift can go undetected and performance of the edge device (e.g., edge device 120 of FIG. 1) can drift from objectives and thresholds required to be achieved by the edge device. System 100 (FIG. 1) can enable detection of data drift in an edge device (e.g., edge device 120 of FIG. 1) deployed without network connectivity. For example, system 100 can be associated with an edge device (e.g., edge device 120 of FIG. 1) and system 100 can generate model 402 (e.g., a first model) and model 404 (e.g., a second model), wherein model 402 and model 404 can be AI models or ML models used for a prediction or classification task (e.g., image detection, facial recognition, classifying X-rays, etc.).

For example, model 402 (e.g., a first model) and model 404 (e.g., a second model) can be used by a standalone traffic camera to detect license plates of a first US state. Model 402 (e.g., a first model) and model 404 (e.g., a second model) can be trained to detect license plates of the first US state with different accuracies, and model 402 and model 404 can be tested for the different accuracies in detecting license plates of the first US state. For example, model 402 (e.g., a first model) can be generated and trained to exhibit the highest possible accuracy (e.g., first accuracy 406) in detecting license plates of the first US state such that model 402 can detect license plates of the first US state with about 97% accuracy. For example, model 404 (e.g., a second model) can be trained to exhibit a lower accuracy (e.g., second accuracy 408) in detecting license plates of the first US state such that model 404 can detect license plates of the first US state with about 90% accuracy. In one or more embodiments, model 404 can be an existing model deployed in a traffic camera to detect license plates of the first US state such that model 404 can exhibit a lower accuracy in detecting license plates of the first US state due to data drift-related performance degradation over time.

Verification component 108 can verify first accuracy 406 of model 402 and second accuracy 408 of model 404 by analyzing respective outputs of model 402 (e.g., a first model) and model 404 (e.g., a second model). For example, test data 101 can comprise 250 license plates of the first US state and 50 license plates of a second US state. Upon ingesting test data 101, model 402 (e.g., a first model) can generate output 403 comprising 242 license plates of the first US state and 58 license plates of a second US state. Verification component 108 can analyze output 403 to verify that model 402 (e.g., a first model) can detect license plates of the first US state with about 97% accuracy. This can be done with various techniques. For example, with binary classification, an accuracy can be calculated by dividing the number of correct predictions by the number of total predictions. For other algorithms (such as multiclass classification, multiple classification, regression, etc.), different evaluation metrics can be used. Similarly, upon ingesting test data 101, model 404 (e.g., a second model) can generate output 405 and verification component 108 can analyze output 405 to verify that model 404 (e.g., a second model) can detect license plates of the first US state with 90% accuracy. Computation component 110 (FIG. 1) can generate a first ratio (e.g., first ratio 115) wherein the first ratio can be a ratio of first accuracy 406 and second accuracy 408 (about 1.078), to enable detection of data drift in an edge device (e.g., edge device 120 of FIG. 1) deployed without network connectivity. Further discussion of the method follows in FIG. 5.

Figure 5:
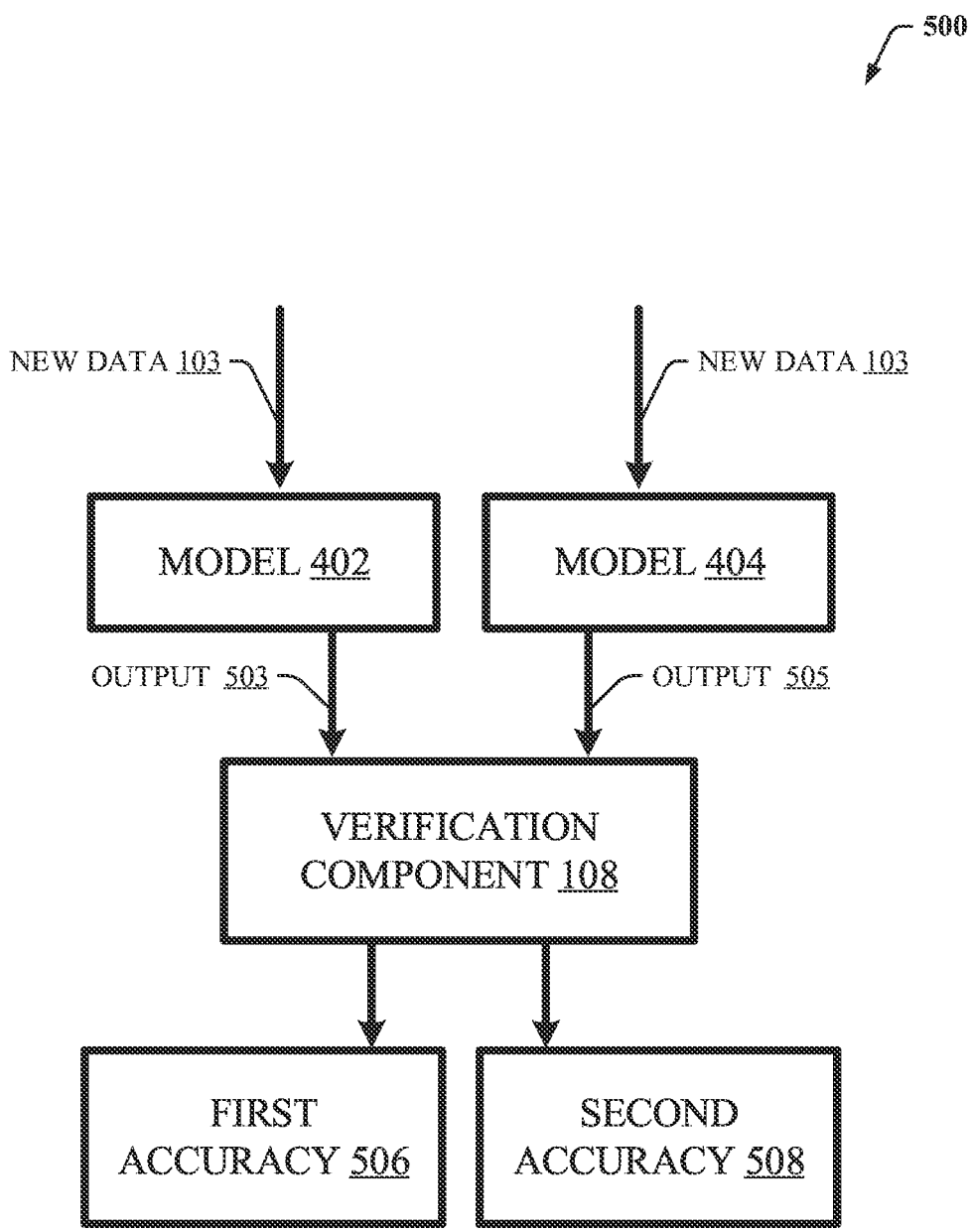
FIG. 5 illustrates a flow diagram of an example, non-limiting method that can enable testing respective accuracies of AI models using production data in accordance with one or more embodiments described herein.

FIG. 5 illustrates a flow diagram 500 of an example, non-limiting method that can enable testing respective accuracies of AI models using production data in accordance with one or more embodiments described herein. Repetitive description of like elements and/or processes employed in respective embodiments is omitted for sake of brevity.

Model 402 (e.g., a first model) and model 404 (e.g., a second model) can be deployed in a traffic camera in the first US state to detect license plates of the first US state. For example, model 402 and model 404 can ingest new data 103 wherein new data 103 can comprise license plates of the first US state, the second US state and other US states. Model 402 can generate output 503 wherein output 503 can be analyzed by verification component 108 to verify that model 402 can exhibit about a 97% accuracy (i.e., first accuracy 506) in detecting license plates of the first US state in real-time. Similarly, model 404 can generate output 505 wherein output 505 can be analyzed by verification component 108 to verify that model 404 can exhibit about an 85% accuracy (i.e., second accuracy 508) in detecting license plates of the first US state in real-time. Computation component 110 (FIG. 1) can generate a second ratio (e.g., second ratio 117) wherein the second ratio can be a ratio of first accuracy 506 and second accuracy 508 (about 1.141), to enable detection of data drift in an edge device (e.g., edge device 120 of FIG. 1) deployed without network connectivity. Analysis component 112 can use a difference between the first ratio (e.g., first ratio 115) and the second ratio (e.g., second ratio 117) to determine whether performance degradation of at least one of model 402 or model 404 is a function of data drift. It is to be appreciated that division (e.g., a ratio) can be employed as an alternative technique.

For example, in the exemplary scenario of license plates of the first US state discussed herein, analysis component 112 can determine a difference (delta or δ) of about 0.063 between the first ratio (e.g., first ratio 115) and the second ratio (e.g., second ratio 117). Alerting component 116 can further analyze the difference (delta or δ) between the ratios (i.e., first ratio 115 and second ratio 117) to determine if the difference exceeds a defined threshold and generate an alert (e.g., alert 119 of FIG. 1) to the edge device. For example, if the difference (delta or δ) between the first ratio (e.g., first ratio 115) and the second ratio (e.g., second ratio 117) exceeds a defined threshold of 0.5, alerting component 116 can alert the edge device (e.g., edge device 120 of FIG. 1) to flag new data 103 ingested by the edge device after the alert. In the exemplary scenario involving license plates discussed herein, the difference of 0.063 may not fall outside of a defined threshold and, therefore, no alert may be generated by alerting component 116. It is to be appreciated that the defined threshold for the alert can be user defined and can vary based on the end use of the edge device and associated models or algorithms.

The threshold for the alert can prevent pollution of data due to hardware problems in an edge device (e.g., edge device 120 of FIG. 1). For example, an IoT edge device (e.g., edge device 120 of FIG. 1) can classify data incorrectly due to hardware problems and not due to data drift, and the incorrect classification may not be a result of data drift. When such a device exhibiting prediction issues is reported for maintenance, the issues can be incorrectly attributed to data drift wherein the data drift experienced by the IoT device can be within the defined threshold. It is to be appreciated that data drift is one type of model degradation that can generate flawed results. Hardware failures can generate flawed results as well but model degradation is not limited to that. Other types of "drift" can include "concept drift", etc. In summary, based on a difference between the ratios of accuracies (e.g., first ratio 115 and second ratio 117) of the two models (e.g., model 402 and model 404), data drift in an edge device (e.g., edge device 120 of FIG. 1) associated with the two models can be detected.

As discussed in one or more embodiments herein, detection component 114 can detect performance degradation of at least one of the first model or the second model by detecting changes in respective distributions of confidence scores over all models with respect to time. For example, as new models are deployed, it can be possible that there is an initial spike or lull as real data is digested. By analyzing the confidence score over time, it can be observed if the predictions are trending towards or away from drift. Additionally, while analyzing prediction results over time, identifications can be made at high minutia as drift occurs, identifying periods (timeframes) of drift (low confidence scores).

With correct randomness and standard sampling deviation, as new data (e.g., new data 103) is ingested by the edge device (e.g., edge device 120 of FIG. 1), if the first ratio and the second ratio (e.g., first ratio 115 and second ratio 117) remain relatively constant (i.e., within the bounds of a defined threshold) and if the new data is consistent with the training data, it can be implied that the new data is not drifting. However, if a difference in respective accuracies of the first model (e.g., model 402) and the second model (e.g., model 404) is 9% during testing but the difference is 15% during deployment, it can be a sign that the edge device is experiencing data drift wherein the new data (e.g., new data 103) comprises different data as compared to the training data for the first model (e.g., 402) and the second model (e.g., model 404). In one or more other embodiments, if the exemplary difference of 9% drops to 2%, it can imply that the degraded model (e.g., model 404) can be outperforming the first model (e.g., model 402), which is a phenomenon that should be investigated due to a difference in performance expectation of the second model (e.g., model 404).

In other words, if the standard deviation of data that the first model (e.g., model 402) and the second model (e.g., model 404) ingest during deployment can remain consistent with the training data used to train the first model and the second model, the main algorithm (e.g. model 402) can be inferred to behave accurately. As discussed in one or more embodiments herein, performance thresholds or bounds can be defined for the performance of the edge device to determine how much the new data (e.g., new data 103) can be drifting. For example, a data drift that can cause performance accuracy of the first model (e.g., model 402) to drop from 99% to 97% can be acceptable, but a data drift that can cause performance accuracy of the first model to drop from 99% to 82% can imply that the edge device is collecting different data than what it was trained on. Once data has drifted long enough such that the data drift falls outside of a defined threshold, data being ingested by the associated edge device or IoT boat can be flagged because data drift outside of the defined threshold can be indicative of the data not being valid, and the edge device can therefore be taking corrective action on incorrect data. Upon examination of the edge device, a data scientist or other individual in charge can send the edge device or IoT boat for maintenance.

In one or more embodiments, the second model (e.g., model 404) can represent various types of machine learning models including Decision Trees, Random Forest Classifiers, Support Vector Machines, Logistic Regression Models, etc. That is, the first model (e.g., model 402) can be compared to various other models. On live/real-time data, a large creep in data, either closer to or further than the two models, can be indicative of data drift and data drift can be estimated using statistical methods.

Figure 6:
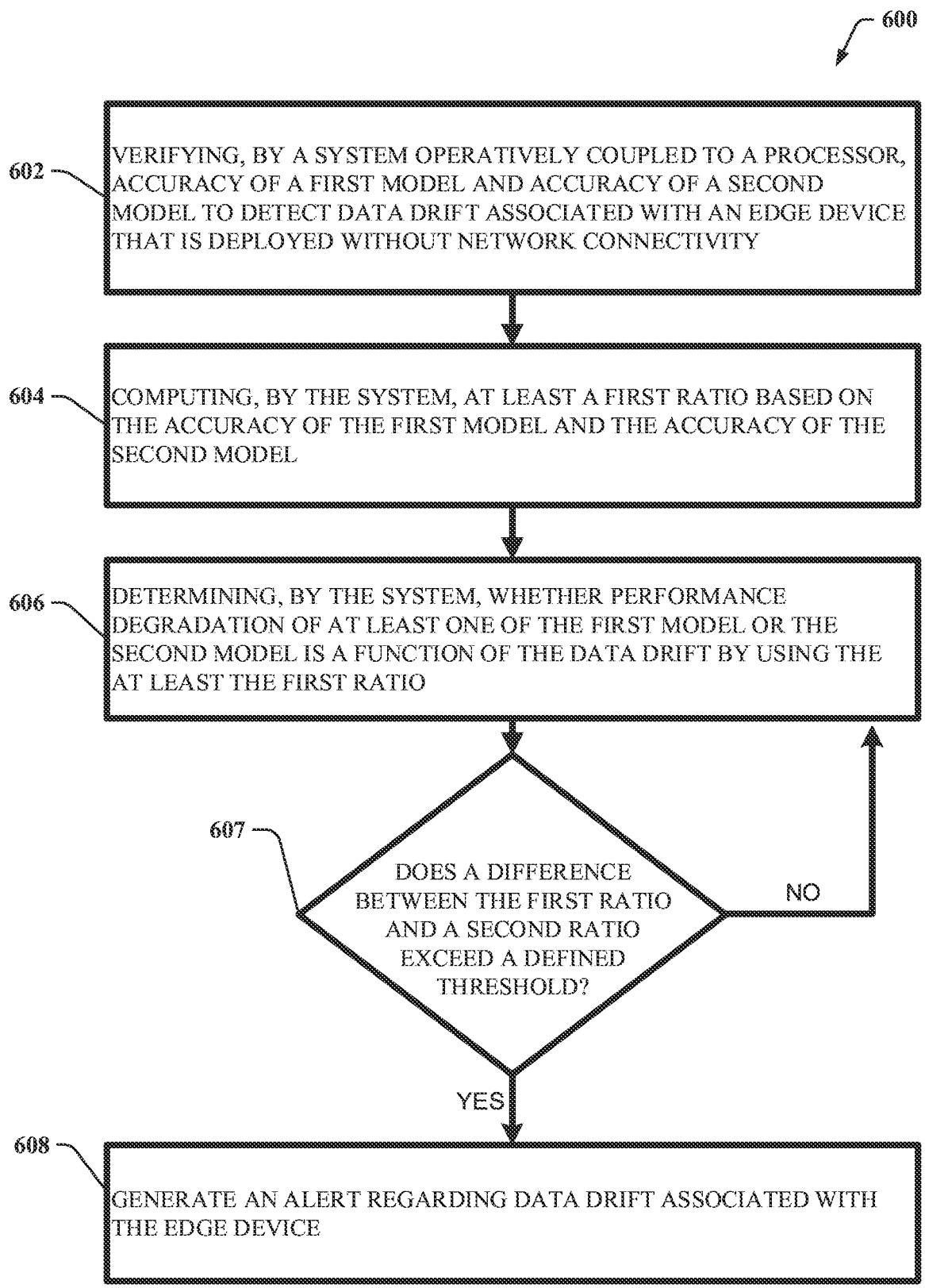
FIG. 6 illustrates a flow diagram of an example, non-limiting method for detection of data drift in an edge device deployed without network connectivity in accordance with one or more embodiments described herein.

FIG. 6 illustrates a flow diagram of an example, non-limiting method 600 for detection of data drift in an edge device deployed without network connectivity in accordance with one or more embodiments described herein. Repetitive description of like elements and/or processes employed in respective embodiments is omitted for sake of brevity.

At 602, the non-limiting method 600 can comprise verifying (e.g., by verification component 108), by a system operatively coupled to a processor, accuracy of a first model and accuracy of a second model to detect data drift associated with an edge device that is deployed without network connectivity.

At 604, the non-limiting method 600 can comprise computing (e.g., by computation component 110), by the system, at least a first ratio based on the accuracy of the first model and the accuracy of the second model.

At 606, the non-limiting method 600 can comprise determining (e.g., by analysis component 112), by the system, whether performance degradation of at least one of the first model or the second model is a function of the data drift by using the at least the first ratio.

At 607, the non-limiting method 600 can comprise determining whether a difference between the first ratio and the second ratio exceeds a defined threshold. If yes, the non-limiting method 600 can generate, at 608, an alert (e.g., by alerting component 116) regarding data drift associated with the edge device. If no, the non-limiting method 600 can continue to determine, at 606, whether performance degradation of at least one of the first model or the second model is a function of the data drift by using the at least the first ratio.

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. Additionally, the computer-implemented methodologies described hereinafter and throughout this specification are capable of being stored on an article of manufacture to enable transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively detect data drift in an edge device as the one or more embodiments described herein can enable this process. And, neither can the human mind nor a human with pen and paper detect data drift in an edge device, as conducted by one or more embodiments described herein.

Figure 7:
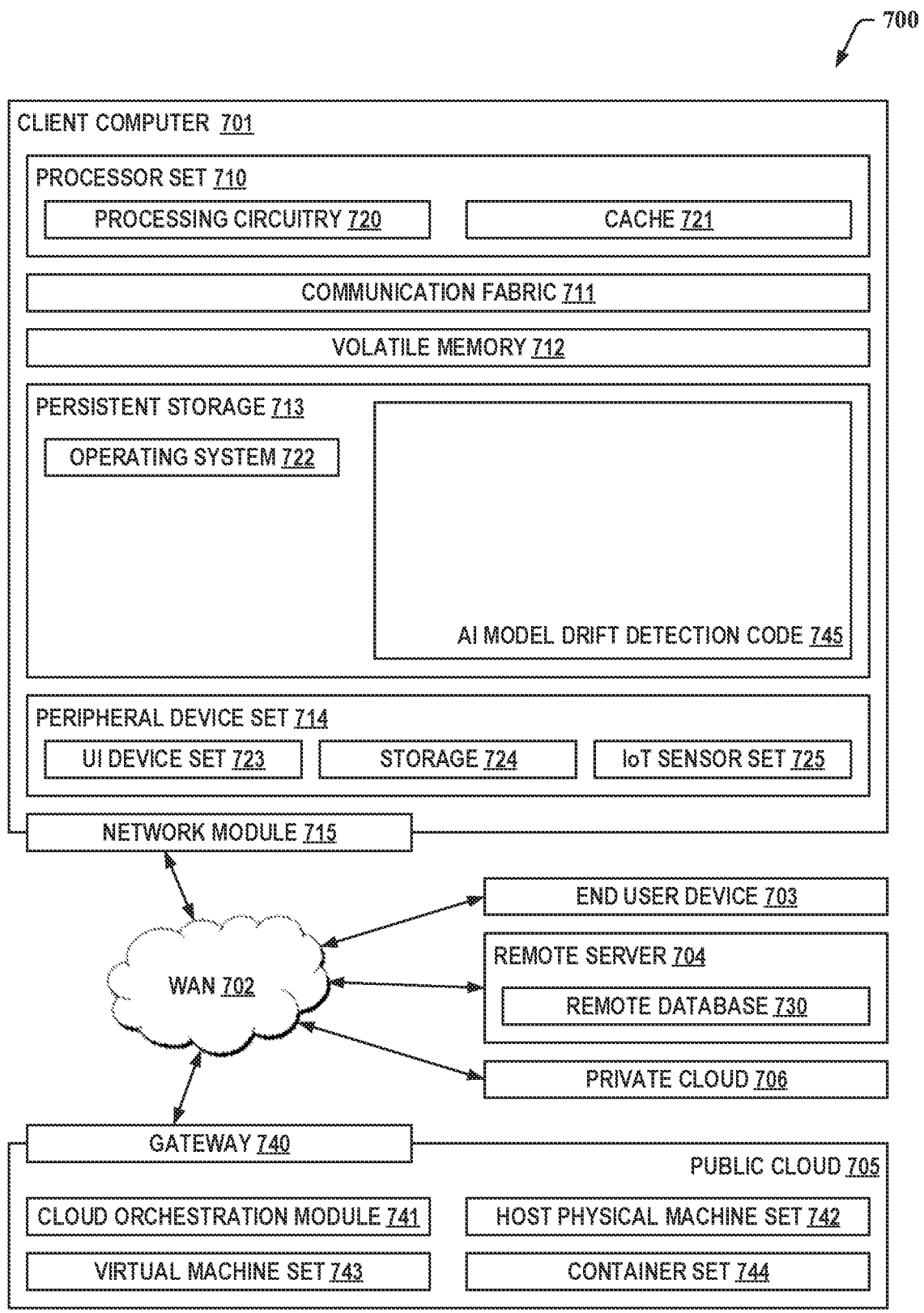
FIG. 7 illustrates a block diagram of an example, non-limiting operating environment in which one or more embodiments described herein can be facilitated.

FIG. 7 illustrates a block diagram of an example, non-limiting, operating environment 700 in which one or more embodiments described herein can be facilitated. FIG. 7 and the following discussion are intended to provide a general description of a suitable operating environment 700 in which one or more embodiments described herein at FIGS. 1-6 can be implemented.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 700 contains an example of an environment for the execution of at least some of the computer code involved in performing the inventive methods, such as AI model drift detection code 745. In addition to block 745, computing environment 700 includes, for example, computer 701, wide area network (WAN) 702, end user device (EUD) 703, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722 and block 745, as identified above), peripheral device set 714 (including user interface (UI), device set 723, storage 724, and Internet of Things (IoT) sensor set 725), and network module 715. Remote server 704 includes remote database 730. Public cloud 705 includes gateway 740, cloud orchestration module 741, host physical machine set 742, virtual machine set 743, and container set 744.

COMPUTER 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. On the other hand, in this presentation of computing environment 700, detailed discussion is focused on a single computer, specifically computer 701, to keep the presentation as simple as possible. Computer 701 may be located in a cloud, even though it is not shown in a cloud in FIG. 7. On the other hand, computer 701 is not required to be in a cloud except to any extent as may be affirmatively indicated.

PROCESSOR SET 710 includes one, or more, computer processors of any type now known or to be developed in the future. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip." In some computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In computing environment 700, at least some of the instructions for performing the inventive methods may be stored in block 745 in persistent storage 713.

COMMUNICATION FABRIC 711 is the signal conduction paths that allow the various components of computer 701 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 712 is any type of volatile memory now known or to be developed in the future. Examples include dynamic type random access memory (RAM) or static type RAM. Typically, the volatile memory is characterized by random access, but this is not required unless affirmatively indicated. In computer 701, the volatile memory 712 is located in a single package and is internal to computer 701, but, alternatively or additionally, the volatile memory may be distributed over multiple packages and/or located externally with respect to computer 701.

PERSISTENT STORAGE 713 is any form of non-volatile storage for computers that is now known or to be developed in the future. The non-volatility of this storage means that the stored data is maintained regardless of whether power is being supplied to computer 701 and/or directly to persistent storage 713. Persistent storage 713 may be a read only memory (ROM), but typically at least a portion of the persistent storage allows writing of data, deletion of data and re-writing of data. Some familiar forms of persistent storage include magnetic disks and solid state storage devices. Operating system 722 may take several forms, such as various known proprietary operating systems or open source Portable Operating System Interface type operating systems that employ a kernel. The code included in block 745 typically includes at least some of the computer code involved in performing the inventive methods.

PERIPHERAL DEVICE SET 714 includes the set of peripheral devices of computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some embodiments, storage 724 may take the form of a quantum computing storage device for storing data in the form of qubits. In embodiments where computer 701 is required to have a large amount of storage (for example, where computer 701 locally stores and manages a large database) then this storage may be provided by peripheral storage devices designed for storing very large amounts of data, such as a storage area network (SAN) that is shared by multiple, geographically distributed computers. IoT sensor set 725 is made up of sensors that can be used in Internet of Things applications. For example, one sensor may be a thermometer and another sensor may be a motion detector.

NETWORK MODULE 715 is the collection of computer software, hardware, and firmware that allows computer 701 to communicate with other computers through WAN 702. Network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (for example, embodiments that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715.

WAN 702 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In some embodiments, EUD 703 may be a client device, such as thin client, heavy client, mainframe computer, desktop computer and so on.

REMOTE SERVER 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704.

PUBLIC CLOUD 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 706 is similar to public cloud 705, except that the computing resources are only available for use by a single enterprise. While private cloud 706 is depicted as being in communication with WAN 702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

What is claimed is:

1. A computer-implemented system, comprising:
   a memory that stores computer executable components; and
   a processor that executes the computer executable components stored in the memory, wherein the computer executable components comprise:
   a verification component that verifies an accuracy of a first model and an accuracy of a second model, wherein the second model is trained to have a lower accuracy than the accuracy of the first model;
   a computation component that computes a first ratio based on verification of respective accuracies of the first model and the second model using test data, and computes a second ratio based on verification of the respective accuracies of the first model and the second model using real-time data generated by an edge device using one or more sensors; and
   an analysis component that uses a difference between the first ratio and the second ratio to detect data drift associated with the edge device and to determine whether performance degradation of at least one of the first model or the second model is a function of the data drift, wherein the edge device is deployed without network connectivity.

2. The computer-implemented system of claim 1, further comprising:
   a detection component that detects the performance degradation of the at least one of the first model or the second model by detecting changes in respective distributions of confidence scores of the first model and the second model over time.

3. The computer-implemented system of claim 1, wherein the verification component verifies the accuracy of the first model and the accuracy of the second model based on the test data, wherein the test data comprises a mixture of data with varying percentages of drift.

4. The computer-implemented system of claim 1, further comprising:

a model generation component that generates the first model and the second model based on machine learning algorithms.

5. The computer-implemented system of claim 1, wherein the verification component further verifies the accuracy of the first model and the accuracy of the second model based on new data received by the edge device.

6. The computer-implemented system of claim 1, wherein the first ratio is computed by dividing the accuracy of the first model determined by using the test data with the accuracy of the second model determined by using the test data.

7. The computer-implemented system of claim 1, further comprising:
an alerting component that generates an alert to the edge device based on difference between the first ratio and the second ratio exceeding a defined threshold, wherein the alert is indicative of the data drift.

8. The computer-implemented system of claim 1, wherein the second ratio is computed by dividing the accuracy of the first model determined by using the real-time data with the accuracy of the second model determined by using the real-time data.

9. A computer-implemented method, comprising:
verifying, by a system operatively coupled to a processor, an accuracy of a first model and an accuracy of a second model, wherein the second model is trained to have a lower accuracy than the accuracy of the first model;
computing, by the system, a first ratio based on verification of respective accuracies of the first model and the second model using test data;
computing, by the system, a second ratio based on verification of the respective accuracies of the first model and the second model using real-time data generated by an edge device using one or more sensors; and
detecting, by the system, data drift associated with the edge device, and determining whether performance degradation of at least one of the first model or the second model is a function of the data drift by using a difference between the first ratio and the second ratio, wherein the edge device is deployed without network connectivity.

10. The computer-implemented method of claim 9, further comprising:
detecting, by the system, the performance degradation of the at least one of the first model or the second model by detecting changes in respective distributions of confidence scores of the first model and the second model over time.

11. The computer-implemented method of claim 9, further comprising:
verifying, by the system, the accuracy of the first model and the accuracy of the second model based on the test data, wherein the test data comprises a mixture of data with varying percentages of drift.

12. The computer-implemented method of claim 9, further comprising:
generating, by the system, the first model and the second model based on machine learning algorithms.

13. The computer-implemented method of claim 9, further comprising:
verifying, by the system, the accuracy of the first model and the accuracy of the second model based on new data received by the edge device.

14. The computer-implemented method of claim 9, further comprising:
computing, by the system, the first ratio by dividing the accuracy of the first model determined by using the test data with the accuracy of the second model determined by using the test data.

15. The computer-implemented method of claim 9, further comprising:
generating, by the system, an alert to the edge device based on the difference between the first ratio and the second ratio exceeding a defined threshold, wherein the alert is indicative of the data drift.

16. The computer-implemented method of claim 9, further comprising:
computing, by the system, the second ratio by dividing the accuracy of the first model determined by using the real-time data with the accuracy of the second model determined by using the real-time data.

17. A computer program product for detecting data drift in an edge device deployed without network connectivity, the computer program product comprising a non-transitory computer readable medium having program instructions embodied therewith, the program instructions executable by a processor to cause the processor to:
verify, by the processor, an accuracy of a first model and an accuracy of a second model, wherein the second model is trained to have a lower accuracy than the accuracy of the first model;
compute, by the processor, a first ratio based on verification of respective accuracies of the first model and the second model using test data;
compute, by the processor, a second ratio based on verification of the respective accuracies of the first model and the second model using real-time data generated by the edge device using one or more sensors; and
detect, by the processor, the data drift associated with the edge device and determine whether performance degradation of at least one of the first model or the second model is a function of the data drift, by using a difference between the first ratio and the second ratio, wherein the edge device is deployed without network connectivity.

18. The computer program product of claim 17, wherein the program instructions are further executable by the processor to cause the processor to:
detect, by the processor, the performance degradation of the at least one of the first model or the second model by detecting changes in respective distributions of confidence scores of the first model and the second model over time.

19. The computer program product of claim 17, wherein the program instructions are further executable by the processor to cause the processor to:
verify, by the processor, the accuracy of the first model and the accuracy of the second model based on the test data, wherein the test data comprises a mixture of data with varying percentages of drift.

20. The computer program product of claim 17, wherein the program instructions are further executable by the processor to cause the processor to:
generate, by the processor, the first model and the second model based on machine learning algorithms.

* * * * *